United States Patent
Zinner et al.

(10) Patent No.: US 10,142,189 B2
(45) Date of Patent: Nov. 27, 2018

(54) MONITORING AND DIAGNOSIS OF A CONTROL DEVICE

(71) Applicant: CONTINENTAL AUTOMOTIVE GMBH, Hannover (DE)

(72) Inventors: Helge Zinner, Magdeburg (DE); Bruno Pöller, Parsberg (DE)

(73) Assignee: Continental Automotive GmbH, Hannover (DE)

( * ) Notice: Subject to any disclaimer, the term of this patent is extended or adjusted under 35 U.S.C. 154(b) by 50 days.

(21) Appl. No.: 14/907,157

(22) PCT Filed: Jul. 22, 2014

(86) PCT No.: PCT/EP2014/065670
§ 371 (c)(1),
(2) Date: Jan. 22, 2016

(87) PCT Pub. No.: WO2015/011117
PCT Pub. Date: Jan. 29, 2015

(65) Prior Publication Data
US 2016/0173344 A1    Jun. 16, 2016

(30) Foreign Application Priority Data
Jul. 25, 2013    (DE) .......................... 10 2013 214 577

(51) Int. Cl.
*H04L 12/24*    (2006.01)
*H04L 12/26*    (2006.01)
(Continued)

(52) U.S. Cl.
CPC ................ *H04L 41/24* (2013.01); *G08B 5/36* (2013.01); *H04L 12/40* (2013.01);
(Continued)

(58) Field of Classification Search
CPC ..... H04L 43/0812; H04L 41/24; H04L 12/40; H04L 43/0817; H04L 2012/40273; G08B 5/36
See application file for complete search history.

(56) References Cited

U.S. PATENT DOCUMENTS 4,978,317 A * 12/1990 Pocrass ................ H01R 13/717
439/490
5,230,000 A *  7/1993 Mozingo .......... G01R 31/31716
714/732

(Continued)

FOREIGN PATENT DOCUMENTS

DE   10 2010 029 346    12/2011
EP      0 963 081          12/1999
(Continued)

*Primary Examiner* — Warner Wong
(74) *Attorney, Agent, or Firm* — Cozen O'Connor

(57) ABSTRACT

A method for monitoring a control device of a vehicle, the control device having an Ethernet transceiver with a link LED output configured to display a network status by an LED connectable thereto, includes: determining a settable diagnosis state of the control device; selecting a signal sequence on the basis of the determined diagnosis state; and controlling the link LED output with the selected signal sequence to output the diagnosis state.

7 Claims, 1 Drawing Sheet

(51) Int. Cl.
*G08B 5/36* (2006.01)
*H04L 12/40* (2006.01)
*H04L 29/08* (2006.01)

(52) U.S. Cl.
CPC .... *H04L 43/0817* (2013.01); *H04L 29/08099* (2013.01); *H04L 43/50* (2013.01); *H04L 2012/40273* (2013.01)

(56) References Cited

U.S. PATENT DOCUMENTS

| | | | |
|---|---|---|---|
| 6,546,345 B1 * | 4/2003 | Ghiasi | G01M 11/332 |
| | | | 702/118 |
| 6,881,096 B2 * | 4/2005 | Brown | H01R 31/06 |
| | | | 439/620.01 |
| 7,808,380 B1 * | 10/2010 | Harel | H04L 41/0893 |
| | | | 340/286.02 |
| 8,103,801 B1 | 1/2012 | Sardella et al. | |
| 9,283,887 B1 * | 3/2016 | Carpenter | B60Q 1/26 |
| 2004/0176927 A1 | 9/2004 | Chen et al. | |
| 2007/0233858 A1 | 10/2007 | Goff et al. | |
| 2011/0267191 A1 | 11/2011 | Slepov | |
| 2012/0136666 A1 | 5/2012 | Corpier et al. | |
| 2013/0016978 A1 * | 1/2013 | Son | H04B 10/116 |
| | | | 398/118 |

FOREIGN PATENT DOCUMENTS

| | | | |
|---|---|---|---|
| EP | | 2335981 A1 | 6/2011 |
| WO | WO 2010/036282 | | 4/2010 |
| WO | WO 2012/139558 | | 10/2012 |

* cited by examiner

MONITORING AND DIAGNOSIS OF A CONTROL DEVICE

CROSS-REFERENCE TO RELATED APPLICATIONS

This is a U.S. national stage of application No. PCT/EP2014/065670, filed on 22 Jul. 2014, which claims priority to the German Application No. DE 10 2013 214 577.2 filed 25 Jul. 2013, the content of each of which incorporated herein by reference.

BACKGROUND OF THE INVENTION

1. Field of the Invention

The invention relates to a method, a computer program and a computer-readable medium for monitoring a control device of a vehicle. The invention also relates to a control device for a vehicle and a diagnosis system.

2. Related Art

During the operation of a motor vehicle, e.g., an automobile, truck, bus, or motor cycle, it is advantageous to know the state of the control devices and the network via which the control devices communicate. Diagnosis devices exist for this purpose in order to read the communication on the different bus systems, such as, for example, CAN, FlexRay, LIN, MOST and Ethernet, and to poll control devices. The generic term diagnosis can be used for this purpose.

Particularly during the development of control devices, it may be necessary to monitor the communication. A wide range of tools are offered by manufacturers for this purpose. Few tools are yet available for Ethernet, since a networking of control devices with Ethernet is not currently widespread.

Diagnosis devices in the automobile sector are normally very expensive and may cost several thousand Euros and cannot be made available at every workstation. The more that can be done with existing facilities, the more economical the development of the control devices thus becomes. This ultimately has an impact on the final product and therefore on the motor vehicle also.

To transmit standard Ethernet, an RJ45 socket can be used to plug in CAT5e cables and interconnect terminal devices. These sockets offer a green and an amber LED which can indicate different network statuses. The indicated statuses are standardized and are identical for each socket (installed in PCs, laptops, servers, etc.). These LEDs are also available in the special Ethernet variant BroadR-Reach, but this uses a different socket.

The green LED (network speed) reports a status relating to the speed of the Ethernet connection and illuminates only when a communication counterpart is connected. The amber LED (link activity) reports a status indicating whether a communication relationship exists and whether data are being transmitted. These LEDs are connected directly to the Ethernet-PHY (physical transceiver).

These sockets are not normally used in automobiles, since they are mostly unsuitable due to their size and EMC characteristics. However, the LEDs can also be placed separately onto the control devices, since each PHY provides the outputs for the LEDs, irrespective of which cable and which connector are used for the Ethernet technology.

Ethernet with a data rate of 100 Mbit/s will come into use in automobiles—a further speed level will not come into use in the foreseeable future (provisionally until 2019) and will furthermore not then replace all existing systems with 100 Mbit/s. The corresponding status LED thus has no added value.

Further status messages of the Ethernet connection cannot be obtained. Additional equipment must be used here or additional hardware must be procured.

SUMMARY OF THE INVENTION

An object of the invention is to design the testing, monitoring and diagnosis of a control device with an Ethernet connection simply and economically.

This object is achieved by the embodiments of the invention found in the following description.

One aspect of the invention relates to a method for monitoring a control device of a vehicle.

The control device can communicate with other control devices and comprises an Ethernet transceiver for this purpose. Examples of a control device of this type in which Ethernet is used are a camera, a radio, an amplifier and other control devices in the vehicle in which large data volumes are transported.

The Ethernet transceiver comprises a link LED output as standard, which is designed to display the network status of an Ethernet connection by an LED (light-emitting diode) connectable thereto. An Ethernet transceiver normally comprises two link LED outputs or outputs to which light-emitting diodes are connectable and which provide information on the Ethernet connection ("link"). The first link LED provides information on the activity of the connection (ON=link active, OFF=link inactive, FLASHING=network activity). The second link LED output indicates the network speed (ON=100 Mbit/s, OFF=10 Mbit/s).

According to one aspect of the invention, the method comprises:
determining a settable diagnosis state of the control device;
selecting a signal sequence on the basis of the diagnosis state, and
controlling the link LED output with the signal sequence to output the diagnosis state.

The settable diagnosis state may, for example, be a diagnosis state of the Ethernet connection, for example how much data is currently being transmitted and/or received, whether faults have occurred, whether errored data packets have been received, etc.

For example, it is desirable to see whether:
packets are being discarded at the Ethernet connection port,
errored packets are being received,
power is also being transmitted via the line,
a BroadR-Reach master/slave configuration exists,
data are being transported, and/or
the maximum utilization is achieved.

A corresponding diagnosis state can be set in the control device.

The diagnosis state may also be a state that relates to the function of the control device, for example whether a fault has occurred in the control device.

The Ethernet transceiver normally comprises a PHY (physical transceiver) and an MAC, wherein the PHY has hardware registers that are written to by a controller via an MAC (for example in order to set the speed of the connection). The PHY may also have a register via which the state of the LED of the LED output can be set (ON/OFF). A program executed in the control device can control and set the link LED output pin by writing to this register.

The proposed solution also provides a very simple facility for an extended fault search. By an individual programming of the LED, a multiplicity of functions and states of the PHY, the MAC and/or the control device can thus very simply be made visible by the LED. The favorable facility to display selected functions can save on the procurement of additional devices, since faults can already be signaled at this level. As a result, the fault search is speeded up through a recognition of states within seconds.

The potential of the LEDs is provided by more or less any PHY and can be exploited as a result without additional costs. The standard hardware can be used for this purpose, with only software modifications being required.

According to one aspect of the invention, the signal sequence is encoded in a pattern of repeating ON/OFF states of the link LED output. For example, numbers or digits can be coded by switching the link LED output on and off in pulses corresponding to the number or digit, a pause then being inserted that is longer than a pause between the pulses, and the pulse sequence is then repeated.

According to one aspect of the invention, the link LED output is designed to be connected to a multicolored LED, i.e., to an LED in which different colors can be set. For example, not only one ON/OFF signal can be emitted via the link LED output, but also a plurality of ON/OFF signals that encode colors of a colored LED. In this case, the signal sequence can also encode colors. For example, the color red can indicate a fault and the color green a correct operation.

According to one aspect of the invention, the method furthermore comprises:
  carrying out a self-test (as a diagnosis state) of the control device, and
  selecting the signal sequence depending on a determined fault state.

For example, a self-test can be carried out before the installation of the vehicle, wherein the result is output via the link LED output to a diagnosis device.

According to one aspect of the invention, the method furthermore comprises:
  capturing signals from the link LED output with a diagnosis device, and
  evaluating the captured signals in order to determine the diagnosis state.

It is not only possible for the diagnosis results to be evaluated visually by a person with an LED connected to the link LED output, but also for the signals emitted by the link LED output to be captured and evaluated by a diagnosis device. More complex signals can also be evaluated in this way.

According to one aspect of the invention, electrical signals from the link LED output are captured by the diagnosis device which may, for example, be connected directly to the link LED output even if no LED is connected thereto, as is normally the case when the control device is installed in the vehicle.

According to one aspect of the invention, optical signals generated by an LED connected to the link LED output are captured by the diagnosis device. To do this, the diagnosis device may comprise, for example, a camera or a light-sensitive sensor.

A further aspect of the invention relates to a computer program which, when it is executed on a processor, instructs the processor to carry out the steps of the method as described above and below. For example, the control device and/or the Ethernet transceiver may have this processor or in each case a processor which executes this computer program.

A further aspect of the invention relates to a computer-readable medium on which a computer program of this type is stored. A computer-readable medium may be a non-volatile memory of the control device. Examples of computer-readable media are RAM, ROM, FLASH memories, hard disks, CDs, DVDs or diskettes.

A further aspect of the invention relates to a control device for a vehicle, wherein the control device comprises an Ethernet transceiver with a link LED output designed to indicate the network status by LEDs connectable thereto, and wherein the control device is designed to determine an internal diagnosis state, to select a signal sequence on the basis of the diagnosis state and to control the link LED output with the signal sequence in order to output the diagnosis state.

A further aspect of the invention relates to a diagnosis system that comprises a control device, as described above and below, and a diagnosis device with a reading device configured to capture signals from the link LED output. For example, the reading device may comprise a connector connectable to an interface of the control device to which the link LED outputs are also connected. The diagnosis device can also determine, directly via the voltage on the link LED outputs, which signal sequence is currently being output by the control device via these outputs.

According to one aspect of the invention, the reading device is configured to capture optical signals. It is also possible for the reading device to comprise a camera or a light-sensitive sensor which, in the case where an LED is connected to the link LED output, the light emitted by the LED is evaluated.

It is to be understood that features of the method as described above and below can also be features of the control device or the diagnosis system, and vice versa.

A further aspect of the invention relates to the use of a link LED output of an Ethernet transceiver of a control device for a vehicle for outputting a diagnosis state of the control device.

BRIEF DESCRIPTION OF THE DRAWINGS

Example embodiments of the invention are described in detail below with reference to the attached figures, in which.

Identical or similar parts are essentially denoted with the same reference numbers.

DETAILED DESCRIPTION OF THE PRESENTLY PREFERRED EMBODIMENTS

Figure 1:
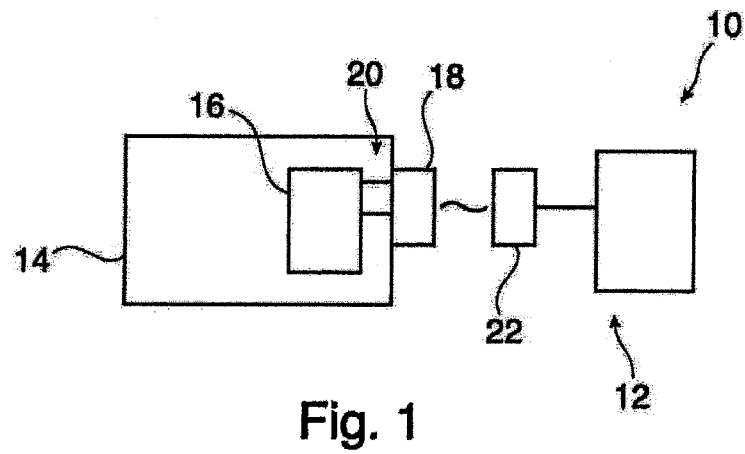
FIG. 1 shows a diagnosis system according to one embodiment of the invention.

FIG. 1 shows a diagnosis system 10 that comprises a diagnosis device 12 and a control device 14 for a vehicle (such as a radio, an on-board computer, an amplifier, an engine control unit, a window opener, etc.).

The control device 14 comprises an Ethernet transceiver 16 to which an LED 18 is connected. The Ethernet transceiver 16 normally has an Ethernet PHY (physical transceiver) and an Ethernet MAC (Media Access Controller). An Ethernet PHY has two link LED outputs 20 via which the standard status described above can be output. These link LED outputs 20 are controlled as standard by the link activity and data rate (10/100/1000) functions. The Ethernet transceiver 16 or PHY also has an additional input to switch the LED 18 on and off. The link LED outputs 20 can be controlled via this input, for example.

The link LED 18 or the link LED output 20 (or both LEDs or outputs) are used by the control device 14 to output or display further data. Through an individual programming, information can thus be output from the control device 14, from the Ethernet PHY and/or the Ethernet MAC via the link LED output 20 and/or can be signaled via the LED 18.

Alternatively or additionally to the aforementioned input, specific registers that cause the LED 18 to illuminate can be written to in the Ethernet PHY for this purpose.

If the LED 18 is connected, a developer, for example, can visually evaluate the LED 18 (or both LEDs) and make inferences therefrom.

Alternatively or additionally, the diagnosis device 12 may have a reading device 22 in the form of a light-sensitive sensor or a camera in order to capture signals from the LED 18. The reading device 22 is thus configured to capture and evaluate optical signals from the LED 18.

Figure 2:
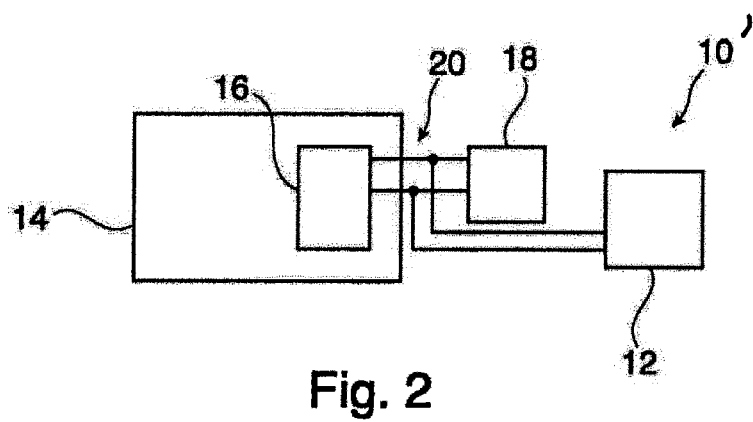
FIG. 2 shows a diagnosis system according to a further embodiment of the invention.

FIG. 2 shows a further diagnosis system 10' in which the electrical signal is tapped by the diagnosis device 12 at the link LED output 20. A connector, for example, into which a corresponding connector of the diagnosis device 12 can be plugged, may be present on the control device 14 for this purpose. The link LED output(s) 20 can generally be connected to a diagnosis connection or a computing unit which then evaluates the signals.

The LED 18 (or both LEDs) are not normally installed in the vehicle for cost and safety reasons (but may be connected for diagnosis purposes during development or during a test phase). The electrical signals that drive the LED 18 can also be used through tapping of the signals at the link LED outputs 20 if no LED 18 is connected.

Figure 3:
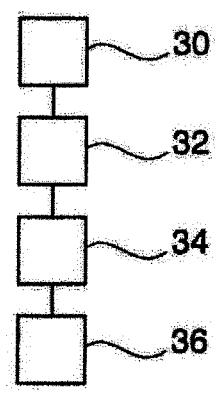
FIG. 3 shows a flow diagram for a method for monitoring a control device according to one embodiment of the invention.

FIG. 3 shows a flow diagram for a method that can be carried out with the diagnosis system of either FIG. 1 or FIG. 2. Steps 30 to 34 are carried out by the control device 14 and an optional step 36 by the diagnosis device 12.

In step 30, the control device 14 determines a settable diagnosis state that can be set, for example, during the manufacture of the control device 14, during the installation of the control device 14 in the vehicle, or during the diagnosis.

For example, the following diagnosis states may be of interest and may be indicated:
  Which data are transported via the Ethernet connection? (for example time-controlled data or background data)
  Is power additionally transmitted via the Ethernet connection? (e.g., by Power over Ethernet)
  Have packets been discarded at this port?
  Have errored packets been received?
  Does a BroadR-Reach (two-wire technology from Broadcom) master/slave configuration exist?
  Is the maximum utilization of the Ethernet connection achieved?
  Is there an error present on Ethernet Layer 1 or an error on Ethernet Layer 2?
  Is the MII connection defective?

In step 32, the control device 14 selects a signal sequence on the basis of the diagnosis state.

For example, it can be set in runtime that the LED 18 is to flash if the transmitted data rate exceeds a volume of 50 Mbit/s. Furthermore, it would also be possible to allow the LED to illuminate/flash in the case where errored packets are received.

The signal sequence may also encode a pattern of repeating ON/OFF states of the link LED output (20), i.e., extending beyond the simple states of "always on", "always off" and "flashing".

Specific information could thus be output, for example, via a flashing code according to the patterns of a Morse code. This can be programmed through individual control by the control device 14 of the LED input (e.g., On Off Off Off On). If, for example, the current data rate is to be queried, this can be signaled by an LED with the flashing code sequence (ON-OFF-ON-OFF (flashing quickly)—PAUSE—ON-OFF-ON-OFF-ON-OFF-ON-OFF-ON-OFF-ON-OFF (flashing quickly). This would correspond to a data rate of 26 Mbit/s.

The link LED output 20 can also be configured so as to be connected to a color LED 18. For example, the use of a color LED can be used during development in order to output a higher number of error outputs. Thus, for example, an error could be signaled via a "RED" color code.

In step 34, the control device 14 controls the link LED output 20 with the signal sequence in order to output the diagnosis state on the link LED output 20.

For example, the ON/OFF input, as described above, can be used individually for this purpose. The LED 18 or the LEDs can then be switched as required via this function to illuminated, flashing or off.

The registers of the Ethernet transceiver 16 (or its PHYs) can be modified during operation via a corresponding computer program executed in the control device 14. Individual signal sequences can thus be output via the LED.

In step 36, the diagnosis device 12 captures signals from the link LED output 20 and evaluates the captured signals in order to determine the diagnosis state.

For example, electrical signals from the link LED output 20 can be captured to provide a simple diagnosis facility if no LEDs are installed. This can be offered by tapping the line 20 or by providing a connector. No hardware modifications to the Ethernet PHY and the control device 14 are required for this purpose. The tapped signals correspond to the LED state.

However, if the LED 18 is connected, optical signals can also be captured and evaluated.

For example, during step 30, a self-test of the control device 14 can be carried out and a signal sequence can then be selected in step 32 depending on a determined fault state.

Each control device 14 is normally finally programmed before delivery or installation in the EOL (End of Line programming). An in-circuit test (ICT) is used here. The ICT is a test method for electronic modules and assembled printed circuit boards in electronics manufacturing. The assembled printed circuit board, once it has been placed on or into a special test adapter, is tested for faults in the circuit tracks (such as short circuits or breaks), soldering defects and component faults. Entire circuit blocks can also be tested.

A detailed fault search or component test can be carried out using test software or by triggering specific functions, and the fault causes can be output on the LED 18 or the output 20. The test sequences are started and, in the event of a malfunction, a fault cause is extracted and evaluated by the test computer. This would require no or hardly any additional hardware and analysis tools and can speed up the EOL and enable a fault search until delivery.

It should additionally be noted that "comprising" does not exclude other elements or steps and "a" or "an" does not exclude a multiplicity. It should furthermore be noted that features or steps that have been described with reference to

The invention claimed is:

1. A method for monitoring a control device (14) of a vehicle, the control device (14) having an Ethernet transceiver (16) with a link LED output (20) configured to display a network status by light displayed by an LED (18) connected to the link LED output (20), the method comprising:
   determining a settable diagnosis state of the control device (14);
   selecting a signal sequence on the basis of the determined diagnosis state of the control device (14);
   controlling the link LED output (20) such that the LED (18) displays light corresponding to the selected signal sequence to optically output the diagnosis state of the control device (14);
   capturing, with a diagnosis device (12), the light displayed by the LED (18) corresponding to the selected signal sequence from the link LED output (20);
   capturing, with the diagnosis device (12), the light displayed by the LED (18) corresponding to the network status;
   modifying, by the control device (14), registers of the Ethernet transceiver (16) during operation to facilitate output of individual signal sequences via the LED (18); and
   evaluating the captured light to determine the diagnosis state of the control device (14) and the network status.

2. The method as claimed in claim 1, further comprising encoding the signal sequence in a pattern of repeating ON/OFF states of the link LED output (20).

3. The method as claimed in claim 2,
   wherein the LED (18) to which the link LED output (20) is connected is a color LED (18); and
   wherein the signal sequence encodes colors.

4. The method as claimed in claim 1, further comprising:
   carrying out a self-test of the control device (14); and
   selecting the signal sequence depending on a determined fault state.

5. A non-transitory computer-readable medium storing a computer program which, when executed on a processor, instructs the processor to carry out the steps of the method as claimed in claim 1.

6. A diagnosis system (10, 10') comprising:
   a control device (14) for a vehicle, the control device (14) including:
      an Ethernet transceiver (16) having a link LED output (20) configured to indicate a network status by light displayed by an LED (18) connected to the link LED output (20),
      wherein the control device (14) is configured to:
         determine an internal diagnosis state of the control device (14),
         select a signal sequence on the basis of the determined diagnosis state of the control device (14), and
         control the link LED output (20) such that the LED (18) displays light corresponding to the selected signal sequence to optically output the diagnosis state of the control device (14);
         modify resisters of the Ethernet transceiver (16) during operation to facilitate output of individual signal sequences via the LED (18); and
   a diagnosis device (12) configured to capture, based on the light displayed by the LED (18), signals from the link LED output (20), the diagnosis device (12) being configured to:
      capture the light displayed by the LED (18) corresponding to the selected signal sequence from the link LED output (20),
      capture the light displayed by the LED (18) corresponding to the network status, and
      evaluate the captured light to determine the diagnosis state of the control device (14) and the network status.

7. The diagnosis system (10, 10') as claimed in claim 6, wherein:
   the diagnosis device (12) has a reading device (22) configured to capture the light displayed by the LED (18) corresponding to signals from the link LED output (20).

* * * * *